(12) United States Patent
Chien et al.

(10) Patent No.: US 12,058,103 B2
(45) Date of Patent: Aug. 6, 2024

(54) IP ADDRESS DISPLAY DEVICE AND POWER DISTRIBUTION UNIT AND UNINTERRUPTIBLE POWER SYSTEM USING THE SAME

(71) Applicant: CYBER POWER SYSTEMS, INC., Taipei (TW)

(72) Inventors: Hung-Chun Chien, Taipei (TW); Wen-Yu Chuang, Taipei (TW); Kuan-Hung Wang, Taipei (TW)

(73) Assignee: CYBER POWER SYSTEMS, INC., Taipei (TW)

( * ) Notice: Subject to any disclaimer, the term of this patent is extended or adjusted under 35 U.S.C. 154(b) by 0 days.

(21) Appl. No.: 16/027,850

(22) Filed: Jul. 5, 2018

(65) Prior Publication Data
US 2019/0372928 A1    Dec. 5, 2019

(30) Foreign Application Priority Data
May 29, 2018    (CN) .......................... 201810529689.5

(51) Int. Cl.
   *H04L 61/5014*    (2022.01)
   *G06F 1/28*    (2006.01)

(52) U.S. Cl.
   CPC ............ *H04L 61/5014* (2022.05); *G06F 1/28* (2013.01)

(58) Field of Classification Search
   CPC .............................. H04L 61/2015; G06F 1/28
   See application file for complete search history.

(56) References Cited

U.S. PATENT DOCUMENTS

| | | | | |
|---|---|---|---|---|
| 2006/0007051 A1* | 1/2006 | Bear | ..................... | G06Q 10/107 345/1.1 |
| 2008/0008197 A1* | 1/2008 | Sakanashi | ........... | H04L 61/2015 370/401 |
| 2009/0234512 A1* | 9/2009 | Ewing | ..................... | H04L 12/10 700/295 |
| 2010/0082789 A1 | 4/2010 | Kim et al. | | |

(Continued)

FOREIGN PATENT DOCUMENTS

| | | |
|---|---|---|
| TW | M387998 U | 9/2010 |
| TW | I385991 B | 2/2013 |

OTHER PUBLICATIONS

Padmanabhan et al, Reasons Dynamic Addresses Change, 2016, ACM, pp. 1-16 (Year: 2016).*

(Continued)

*Primary Examiner* — Raqiul A Choudhury
(74) *Attorney, Agent, or Firm* — BACON & THOMAS, PLLC (57) ABSTRACT

An IP address display device suitable for a power device is provided. The IP address display device comprises a communication interface, a display interface, and a control circuit. The control circuit is electrically coupled to the communication interface and the display interface, and is used to determine whether an IP address allocated by a DHCP server has been obtained through the communication interface. When the determination result is yes, the control circuit automatically displays the obtained IP address by the display interface for a preset time. In addition, a power distribution unit and an uninterruptible power system using the same are also provided.

16 Claims, 5 Drawing Sheets

(56) References Cited

U.S. PATENT DOCUMENTS

| | | | | |
|---|---|---|---|---|
| 2010/0312875 | A1* | 12/2010 | Wilerson | H04L 29/12066 709/224 |
| 2012/0316698 | A1* | 12/2012 | Daniel | G06F 1/266 700/297 |
| 2014/0250213 | A1* | 9/2014 | Seki | G06K 15/4045 709/220 |
| 2014/0307279 | A1* | 10/2014 | Yasui | G06F 3/1204 358/1.13 |
| 2016/0080589 | A1* | 3/2016 | Talwerdi | G07C 9/00087 358/1.12 |
| 2016/0100356 | A1* | 4/2016 | Liu | H04W 12/06 370/329 |
| 2016/0330614 | A1* | 11/2016 | Paku | H04W 8/26 |
| 2017/0346786 | A1* | 11/2017 | Morimoto | H04L 41/048 |

OTHER PUBLICATIONS

Canon, iPF785 User's Guide, Apr. 7, 2015, Canon, ver 1.10, 700 pages (Year: 2015).*
Falk, Exploring the UI Universe: Different Types of UI, 2014, Altia, 3 pages (Year: 2014).*

\* cited by examiner

IP ADDRESS DISPLAY DEVICE AND POWER DISTRIBUTION UNIT AND UNINTERRUPTIBLE POWER SYSTEM USING THE SAME

BACKGROUND OF THE INVENTION

Field of the Invention

The present invention relates to the technical field of power device, and more particularly, to an IP address display device suitable for a power device, and a power distribution unit and an uninterruptible power system using the same.

Description of Related Art

At present, power devices, such as power distribution units (PDUs) and uninterruptible power systems (UPSs), have been widely used in various types of equipment rooms (e.g., data centers), so as to distribute power and provide backup power to different equipment in the equipment rooms, respectively. In addition, most of such power devices have network interfaces for remote management.

However, since multiple power distribution units and multiple uninterruptible power systems are commonly used in an equipment room, how to quickly obtain the IP addresses (Internet protocol addresses) of these power devices for remote management has become an important issue.

SUMMARY OF THE INVENTION

An object of the present invention is to provide an IP address display device suitable for a power device. When the IP address display device determines that an IP address allocated by a DHCP server (dynamic host configuration protocol server) has been obtained, the IP address display device automatically displays the obtained address.

Another object of the present invention is to provide a power distribution unit adopting the aforementioned IP address display device.

Still another object of the present invention is to provide an uninterruptible power system adopting the aforementioned IP address display device.

To achieve the above object, the present invention provides an IP address display device suitable for a power device. The IP address display device comprises a communication interface, a display interface, and a control circuit. The control circuit is electrically coupled to the communication interface and the display interface, and is used to determine whether an IP address allocated by a DHCP server has been obtained through the communication interface. When the determination result is yes, the control circuit automatically displays the obtained IP address by the display interface for a preset time.

To achieve the above object, the present invention further provides a power distribution unit. The power distribution unit comprises a communication interface, a display interface, and a control circuit. The control circuit is electrically coupled to the communication interface and the display interface, and is used to determine whether an IP address allocated by a DHCP server has been obtained through the communication interface. When the determination result is yes, the control circuit automatically displays the obtained IP address by the display interface for a preset time.

To achieve the above object, the present invention further provides an uninterruptible power system. The uninterruptible power system comprises a communication interface, a display interface, and a control circuit. The control circuit is electrically coupled to the communication interface and the display interface, and is used to determine whether an IP address allocated by a DHCP server has been obtained through the communication interface. When the determination result is yes, the control circuit automatically displays the obtained IP address by the display interface for a preset time.

In order to make the above objects, technical features and gains after actual implementation more obvious and easy to understand, in the following, the preferred embodiments will be described with reference to the corresponding drawings and will be described in more detail.

BRIEF DESCRIPTION OF THE DRAWINGS

Other features and advantages of the present invention will become apparent in the following detailed description of the preferred embodiments with reference to the accompanying drawings, of which.

DESCRIPTION OF EMBODIMENTS

The characteristics, contents, advantages and achieved effects of the present disclosure will become more fully understood from the detailed description given herein below and the accompanying drawings which are given by way of illustration only, and thus are not limitative of the present disclosure.

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 1:
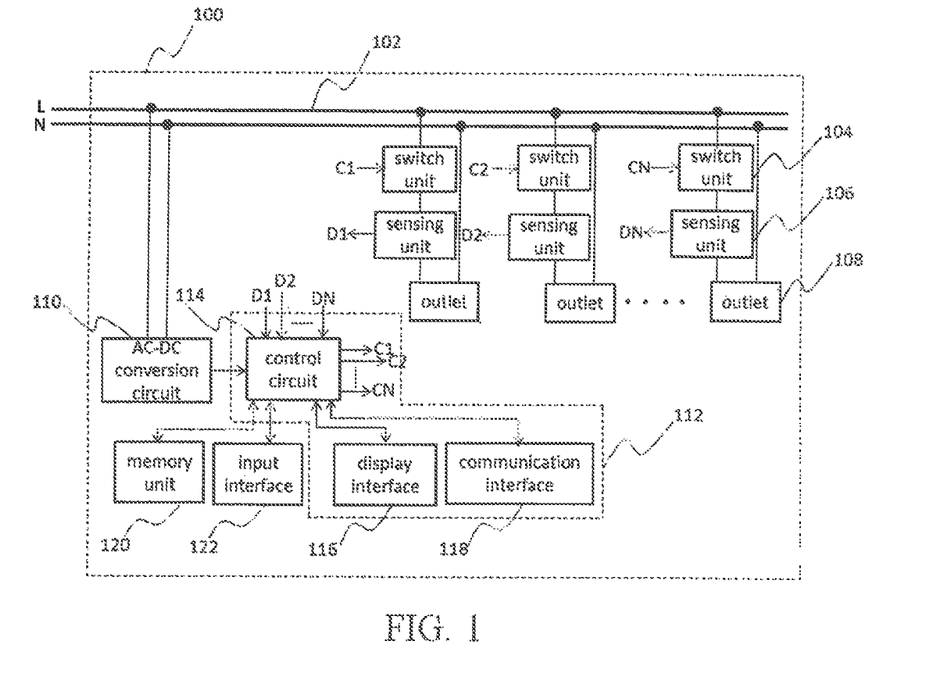
FIG. 1 is a block diagram of a power distribution unit adopting an IP address display device according to an embodiment of the present invention.

FIG. 1 is a block diagram of a power distribution unit adopting an IP address display device according to an embodiment of the present invention. As shown in FIG. 1, the power distribution unit 100 comprises two conductors 102, a plurality of switch units 104, a plurality of sensing units 106, a plurality of outlets 108, an AC-DC conversion circuit 110, an IP address display device 112, a memory unit 120 and an input interface 122, wherein the IP address display device 112 comprises a control circuit 114, a display interface 116, and a communication interface 118.

One of the conductors 102 is used to electrically couple an AC power source L, and the other conductor 102 is used to electrically couple a neutral line N. Each outlet 108 is electrically coupled to the neutral line N through one of the conductors 102, and each outlet 108 is electrically coupled to the AC power source L sequentially through one of the sensing units 106, one of the switch units 104 and the other conductor 102. The coupling manners of the outlets 108 described above are not used to limit the present invention. For example, each outlet 108 can be electrically coupled to the AC power source L through one of the conductors 102, and each outlet 108 can be electrically coupled to the neutral line N sequentially through one of the sensing units 106, one of the switch units 104 and the other conductor 102.

In addition, an input of the AC-DC conversion circuit 110 is electrically coupled to the two conductors 102. As for the control circuit 114, it is electrically coupled with an output of the AC-DC conversion circuit 110, the memory unit 120, the input interface 122, the display interface 116, the communication interface 118, each switch t 104 and each sensing unit 106. Each sensing unit 106 is used to measure current and accordingly provide a sensing result (as shown by D1 to DN, respectively, where N is a natural number). In this way, the control circuit 114 can calculate a corresponding loading according to each sensing result. The control circuit 114 is also used to output control signals C1 to CN, where N is a natural number, so as to control the on/off state of the switch units 104, respectively. In addition, the above-mentioned input interface 122 is used for a user to operate the display interface 116, and is used for the user to directly input a control command to the control circuit 114. Furthermore, the above-mentioned communication interface 118 can be a wired communication interface or a wireless communication interface, and the present invention is not limited thereto.

Figure 2:
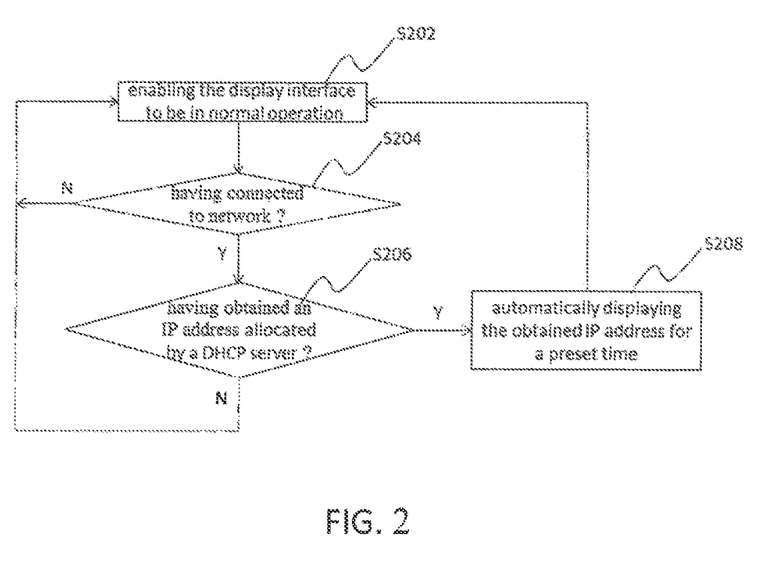
FIG. 2 is a flowchart of an operation of an IP address display device according to an embodiment of the present invention.
Figure 3:
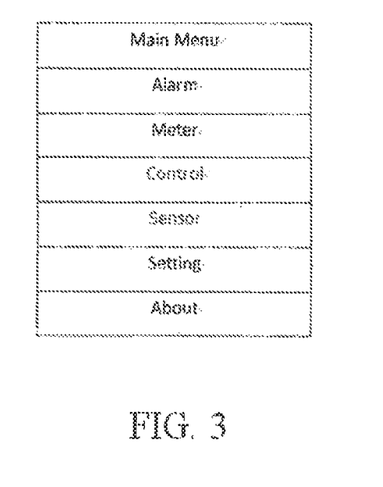
FIG. 3 shows the display interface displaying a main menu.

FIG. 2 is a flowchart of an operation of an IP address display device according to an embodiment of the present invention. Referring to FIGS. 2 and 1, in this embodiment, when the power distribution unit 100 is electrically coupled to the AC power source L and the neutral line N, the AC-DC conversion circuit 110 provides operation power to the control circuit 114, so that the control circuit 114 can enable the display interface 116 to be in normal operation (as shown in step S202). At this time, the image displayed by the display interface 116 can be, for example, the image as shown in FIG. 3. FIG. 3 shows the display interface displaying a main menu.

Next, the control circuit 114 determines whether a network has been connected through the communication interface 118 (as shown in step S204). In step S204, when the determination result is no, the control circuit 114 returns to step S202. On the other hand, when the determination result is yes, the control circuit 114 further determines whether an IP address allocated by a DHCP server has been obtained through the communication interface 118 (as shown in step S206).

Figure 4:
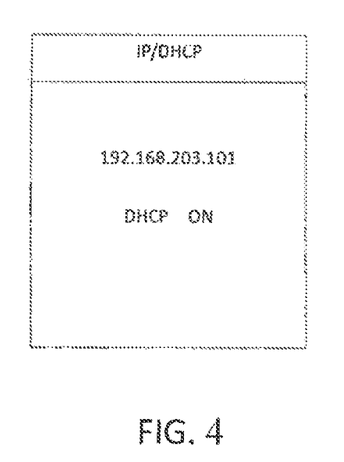
FIG. 4 shows the display interface displaying the obtained IP address.

In step S206, when the determination result is no, the control circuit 114 returns to step S202. On the other hand, when the determination result is yes, the control circuit 114 automatically displays the obtained IP address by the display interface 116 for a preset time (as shown in step S208). FIG. 4 shows the delay interface displaying the obtained IP address. After step S208 is performed, the control circuit 114 returns to step S202. It is worth mentioning that, in this embodiment, the control circuit 114 can store the obtained IP address in an internal register thereof (not shown), or store the obtained IP address in the memory unit 120 for accessing when needed.

From the above description, it can be seen that when the IP address display device 112 determines that an IP address allocated by a DHCP server has been obtained, the IP address display device 112 automatically displays the obtained IP address, so that a user can quickly obtain the IP address of the power distribution unit 100 for remote management.

In addition, for flexibility in operations, the control circuit 114 can receive a control command transmitted by a user through the input interface 122 or the communication interface 118, and adjust the length of the preset time accordingly, or determine whether to enable the function of automatically displaying the obtained IP address accordingly. It is worth mentioning that although in this embodiment the power distribution unit 100 adopts a plurality of switch units 104, a plurality of sensing units 106, a memory unit 120, and an input interface 122, however, whether to adopt these components in the power distribution unit 100 can be determined based on actual design requirements.

Figure 5:
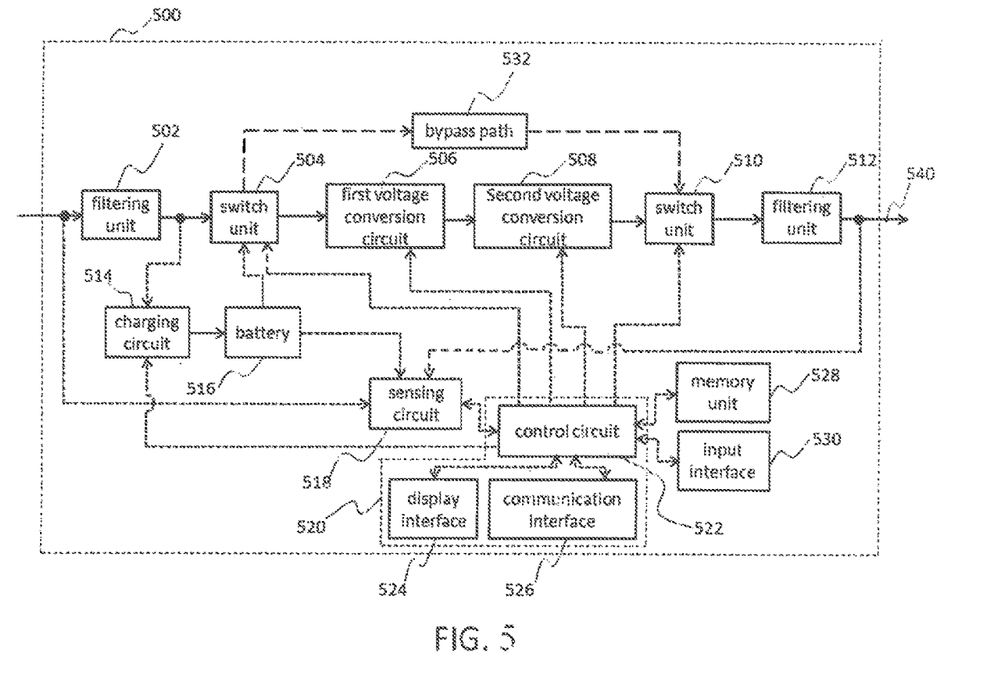
FIG. 5 is a block diagram of an uninterruptible power system adopting an IP address display device according to an embodiment of the present invention.

FIG. 5 is a block diagram of an uninterruptible power system adopting an IP address display device according to an embodiment of the present invention. As shown in FIG. 5, the uninterruptible power system 500 comprises a filtering unit 502, a switch unit 504, a first voltage conversion circuit 506, a second voltage conversion circuit 508, a switch unit 510, a filtering unit 512, a charging circuit 514, a battery 516, a sensing circuit 518, an IP address display device 520, a memory unit 528, an input interface 530, and a bypass path 532, wherein the IP address display device 520 comprises a control circuit 522, a display interface 524, and a communication interface 526.

The switch unit 504 is electrically coupled to the battery 516 and one terminal of the bypass path 532, and is electrically coupled to AC mains (not shown) through the filtering unit 502. The charging circuit 514 is electrically coupled to the battery 516 and an output of the filtering unit 502, and is used for charging the battery 516. An input terminal of the first voltage conversion circuit 506 is electrically coupled to the switch unit 504. An input terminal of the second voltage conversion circuit 508 is electrically coupled to an output terminal of the first voltage conversion circuit 506. The switch unit 510 is electrically coupled to an output of the second voltage conversion circuit 508 and the other terminal of the bypass path 532, and is electrically coupled to an output 540 of the uninterruptible power system 500 through the filtering unit 512, wherein the output 540 of the uninterruptible power system 500 is used for electrically coupling a back-end device (not shown). The sensing circuit 518 is electrically coupled to the AC mains, the battery 516, and the output 540 of the uninterruptible power system 500, so as to measure the power state of the AC mains, the battery 516, and the output 540 of the uninterruptible power system 500.

As for the control circuit 522, it is electrically coupled to the switch unit 504, the first voltage conversion circuit 506, the second voltage conversion circuit 508, the switch unit 510, the charging circuit 514, the sensing circuit 518, the display interface 524, the communication interface 526, the memory unit 528, and the input interface 530, so as to control the operation of these components. For example, the control circuit 522 can control the first voltage conversion circuit 506 to perform a DC-DC voltage conversion operation or an AC-DC voltage conversion operation, and control the second voltage conversion circuit 108 to perform a DC-AC voltage conversion operation. In addition, the control circuit 522 can control the switch unit 504 to transfer the output of the filtering unit 502 to the first voltage conversion circuit 506 or the bypass path 532, or control the switch unit 504 to transfer the output of the battery 516 to the first voltage conversion circuit 506. Further, the control circuit 522 can control the switch unit 510 to transfer the output of the second voltage conversion circuit 508 to the filtering unit 512, or control the switch unit 510 to electrically couple the bypass path 532 to the filtering unit 512.

In addition, the above-mentioned input interface 530 is used for a user to operate the display interface 524, or for the user to directly input a control command to the control circuit 522. Furthermore, the above-mentioned communication interface 526 can be a wired communication interface or a wireless communication interface, and the present invention is not limited thereto.

Referring to FIGS. 5 and 2, in this embodiment, when the uninterruptible power system 500 is electrically coupled to the AC mains, the operation power supplying circuit (not shown) in the uninterruptible power system 500 provides operation power to the control circuit 522, so that the control circuit 522 can enable the display interface 524 to be in normal operation (as shown in step S202). At this time, the image displayed by the display interface 524 can be, for example, the image as shown in FIG. 3. FIG. 3 shows the display interface displaying a main menu.

Next, the control circuit 522 determines whether a network has been connected through the communication interface 526 (as shown in step S204). In step S204, when the determination result is no, the control circuit 522 returns to step S202. On the other hand, when the determination result is yes, the control circuit 522 further determines whether an IP address allocated by a DHCP server has been obtained through the communication interface 526 (as shown in step S206).

In step S206, when the determination result is no, the control circuit 522 returns to step S202. On the other hand, when the determination result is yes, the control circuit 522 automatically displays the obtained IP address by the display interface 524 for a preset time (as shown in step S208). FIG. 4 shows the display interface displaying the obtained IP address. After step S208 is performed, the control circuit 522 returns to step S202. It is worth mentioning that, in this embodiment, the control circuit 522 can store the obtained IP address in an internal register thereof (not shown), or store the obtained IP address in the memory unit 528 for accessing when needed.

From the above description, it can be seen that when the IP address display device 520 determines that an IP address allocated by a DHCP server has been obtained, the IP address display device 520 automatically displays the obtained IP address, so that a user can quickly obtain the IP address of the uninterruptible power system 500 for remote management.

In addition, for flexibility in operations, the control circuit 522 can receive a control command transmitted by a user through the input interface 530 or the communication interface 526, and adjust the length of the preset time accordingly, or determine whether to enable the function of automatically displaying the obtained IP address accordingly. It is worth mentioning that although in this embodiment the uninterruptible power system 500 adopts the filtering unit 502, the filtering unit 512, the memory unit 528, and the input interface 530, however, whether to adopt these components in the uninterruptible power system 500 can be determined based on actual design requirements. Furthermore, although FIG. 5 exemplifies a type of the uninterruptible power systems, this is not intended to limit the present invention. Those skilled in the art should know that the IP address display device 520 of the present invention can be applied to all types of the uninterruptible power systems such as off-line type, on-line type, and line interactive type.

In summary, when the IP address display device determines that an IP address allocated by a DHCP server has been obtained, the IP address display device automatically displays the obtained IP address, so that a user can quickly obtain the IP address of the power device (e.g., power distribution unit, uninterruptible power system) adopting the IP address display device for remote management.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An IP address display device suitable for a power device, comprising:
   a communication interface;
   a display interface; and
   a control circuit, electrically coupled to the communication interface and the display interface, wherein the control circuit is used to display an image showing a main menu by the display interface after the power device is electrically coupled to an AC power source and then determine whether an IP address allocated by a DHCP server has been obtained through the communication interface, and when the determination result is yes, the control circuit controls the display interface to execute the following operations:
   automatically displaying another image showing the obtained IP address to replace the image showing the main menu for a preset time, so that a user can obtain the IP address of the power device for remote management, wherein a length of the preset time is adjusted according to a control command from an input interface or the communication interface, and
   automatically reverting to the image showing the main menu after the preset time.

2. The IP address display device as claimed in claim 1, wherein the control circuit further determines whether a network has been connected through the communication interface, and when the determination result is yes, the control circuit further determines whether the IP address allocated by the DHCP server has been obtained through the communication interface.

3. The IP address display device as claimed in claim 1, wherein the control circuit stores the obtained IP address in an internal register thereof.

4. The IP address display device as claimed in claim 1, wherein the control circuit is further electrically coupled to a memory unit, so as to store the obtained IP address in the memory unit.

5. The IP address display device as claimed in claim 1, wherein the power device comprises a power distribution unit or an uninterruptible power system.

6. The IP address display device as claimed in claim 1, wherein the control circuit further determines whether to enable the function of automatically displaying the obtained IP address according to the control command.

7. A power distribution unit, comprising:
a communication interface;
a display interface; and
a control circuit, electrically coupled to the communication interface and the display interface, wherein the control circuit is used to display an image showing a main menu by the display interface after the power distribution unit is electrically coupled to an AC power source and then determine whether an IP address allocated by a DHCP server has been obtained through the communication interface, and when the determination result is yes, the control circuit controls the display interface to execute the following operations:
automatically displaying another image showing the obtained IP address to replace the image showing the main menu for a preset time, so that a user can obtain the IP address of the power device for remote management, wherein a length of the preset time is adjusted according to a control command from an input interface or the communication interface, and
automatically reverting to the image showing the main menu after the preset time.

8. The power distribution unit as claimed in claim 7, wherein the control circuit further determines whether a network has been connected through the communication interface, and when the determination result is yes, the control circuit further determines whether the IP address allocated by the DHCP server has been obtained through the communication interface.

9. The power distribution unit as claimed in claim 7, wherein the control circuit stores the obtained IP address in an internal register thereof.

10. The power distribution unit as claimed in claim 7, further comprising a memory unit, wherein the memory unit is electrically coupled to the control circuit, and is used for storing the obtained IP address.

11. The power distribution unit as claimed in claim 7, wherein the control circuit further determines whether to enable the function of automatically displaying the obtained IP address according to the control command.

12. An uninterruptible power system, comprising:
a communication interface;
a display interface; and
a control circuit, electrically coupled to the communication interface and the display interface, wherein the control circuit is used to display an image showing a main menu by the display interface after the uninterruptible power system is electrically coupled to an AC power source and then determine whether an IP address allocated by a DHCP server has been obtained through the communication interface, and when the determination result is yes, the control circuit controls the display interface to execute the following operations:
automatically displaying another image showing the obtained IP address to replace the image showing the main menu for a preset time, so that a user can obtain the IP address of the power device for remote management, wherein a length of the preset time is adjusted according to a control command from an input interface or the communication interface, and
automatically reverting to the image showing the main menu after the preset time.

13. The uninterruptible power system as claimed in claim 12, wherein the control circuit further determines whether a network has been connected through the communication interface, and when the determination result is yes, the control circuit further determines whether the IP address allocated by the DHCP server has been obtained through the communication interface.

14. The uninterruptible power system as claimed in claim 12, wherein the control circuit stores the obtained IP address in an internal register thereof.

15. The uninterruptible power system as claimed in claim 12, further comprising a memory unit, wherein the memory unit is electrically coupled to the control circuit, and is used for storing the obtained IP address.

16. The uninterruptible power system as claimed in claim 12, wherein the control circuit further determines whether to enable the function of automatically displaying the obtained IP address according to the control command.

* * * * *